(12) United States Patent
Kuzumaki

(10) Patent No.: US 6,631,377 B2
(45) Date of Patent: Oct. 7, 2003

(54) QUESTION ANSWERING SYSTEM AND STORAGE MEDIUM

(75) Inventor: Hiroshi Kuzumaki, Ota (JP)

(73) Assignee: Fujitsu Limited, Kawasaki (JP)

(*) Notice: Subject to any disclaimer, the term of this patent is extended or adjusted under 35 U.S.C. 154(b) by 77 days.

(21) Appl. No.: 09/808,003

(22) Filed: Mar. 15, 2001

(65) Prior Publication Data

US 2001/0032211 A1 Oct. 18, 2001

(30) Foreign Application Priority Data

Apr. 13, 2000 (JP) .......................... 2000-112013

(51) Int. Cl.[7] .................. G06F 17/30; G06F 15/16; G06F 17/60
(52) U.S. Cl. .................. 707/10; 707/3; 707/102; 707/103 R; 705/10; 705/7; 709/2; 709/217; 709/218
(58) Field of Search .............................. 705/10, 7; 35/9; 600/300; 709/217, 218; 707/10, 103 R, 102, 3

(56) References Cited

U.S. PATENT DOCUMENTS

| | | | | |
|---|---|---|---|---|
| 4,069,597 A | * | 1/1978 | Bigorre | 35/9 |
| 5,964,700 A | * | 10/1999 | Tallman et al. | 600/300 |
| 6,064,978 A | * | 5/2000 | Gradner et al. | 705/10 |
| 6,175,833 B1 | * | 1/2001 | West et al. | 707/102 |
| 6,189,029 B1 | * | 2/2001 | Fuerst | 709/217 |

\* cited by examiner

*Primary Examiner*—Frantz Coby
(74) *Attorney, Agent, or Firm*—Staas & Halsey LLP

(57) ABSTRACT

A question answering system includes a storage for storing question information together with first time information, a storage for storing answer information with respect to the question information together with solver information and second time information, and an evaluating part for evaluating a solver indicated by the solver information based on the first and second time information.

4 Claims, 8 Drawing Sheets

FIG. 5

| INDEX | INCENTIVE |
|---|---|
| 0~999 | ￥100 |
| 1000~9999 | ￥1000 |
| 10000~99999 | ￥2000 |
| 100000~ | ￥5000 |

FIG. 6

| FAQ-ID | QUESTION | ANSWER | AID | AUID |
|---|---|---|---|---|
| | | | | |
| | | | | |
| | | | | |
| | | | | |

FIG. 7

| QID | QUESTION | QUID | QTIME |
|---|---|---|---|
| | | | |
| | | | |
| | | | |
| | | | |

FIG. 8

| QID | QUESTION | QUID | QTIME | AID ANSWER | AUID | ATIME | EVAL |
|---|---|---|---|---|---|---|---|
| | | | | | | | |
| | | | | | | | |
| | | | | | | | |
| | | | | | | | |

| AUID | COUNT |
|------|-------|
|      |       |
|      |       |
|      |       |
|      |       |

QUESTION ANSWERING SYSTEM AND STORAGE MEDIUM

BACKGROUND OF THE INVENTION

This application claims the benefit of a Japanese Patent Application No. 2000-112013 filed Apr. 13, 2000, in the Japanese Patent Office, the disclosure of which is hereby incorporated by reference.

1. Field of the Invention

The present invention generally relates to question answering systems and storage media, and more particularly to a question answering system suited for an Internet Web server and to a computer-readable storage medium which stores a program for causing a computer realize a question answering system.

Recently, various kinds of services are being provided using the Web. Some services which are provided require a question answering system to cope with questions and answers for trouble-shooting, Web Based Training (WBT) and the like for personal computers, for example. Normally, such a question answering system has a database system called a Frequent Asked Question (FAQ) database. A question from a questioner is first searched in the FAQ database, and the question is stored in the FAQ database if no corresponding data exists in the FAQ database. At the same time, the question is notified to a solver, and an answer to the question is notified to the questioner from the solver via an e-mail or a Web page.

2. Description of the Related Art

Normally, in order to constantly and quickly cope with a question in such a question answering system, a solver must constantly be on standby so that it is possible to accept the question, and the cost for operating the question answering system is high. Particularly when providing the services of the question answering system over the Internet, it is necessary to accept questions 24 hours a day, and it is a considerable burden on the operator who must bear the cost of having one solver on standby 24 hours a day with respect to each expert field. But if the number of solvers is reduced to reduce the operating cost of the question answering system, particularly the personnel expenses, the quality of the question answering system becomes poor.

SUMMARY OF THE INVENTION

Accordingly, it is a general object of the present invention to provide a novel and useful question answering system and computer-readable storage medium, in which the problems described above are eliminated.

Another and more specific object of the present invention is to provide a question answering system and a computer-readable storage medium, which can suppress the personnel expenses of having the solvers for answering the questions, and also improve the quality of the question answering system.

Still another object of the present invention is to provide a question answering system comprising first storing means for storing question information together with first time information, second storing means for storing answer information with respect to the question information together with solver information and second time information, and evaluating means for evaluating a solver indicated by the solver information based on the first and second time information. According to the question answering system of the present invention, it is possible to suppress the personnel expenses of having the solvers for answering the questions, and also improve the quality of the question answering system.

A further object of the present invention is to provide a question answering system comprising first registering means for registering question information, transmitting means for transmitting to a questioner an answer provided by a solver with respect to the registered question information, second registering means for registering an evaluation of the answer made by the questioner, and evaluating means for evaluating the solver based on the registered evaluation made by the questioner. According to the question answering system of the present invention, it is possible to suppress the personnel expenses of having the solvers for answering the questions, and also improve the quality of the question answering system.

Another object of the present invention is to provide a question answering system comprising storing means for storing questions and corresponding answers, counting means for counting a number of times a reference is made to each of the stored answers, and evaluating means for obtaining a sum total of the number of times the reference is made to the stored answers for each of solvers who provided the answers, and evaluating each of the solvers based on the sum total. According to the question answering system of the present invention, it is possible to suppress the personnel expenses of having the solvers for answering the questions, and also improve the quality of the question answering system.

Still another object of the present invention is to provide a question answering system comprising registering means for registering answers with respect to questions, evaluating means for evaluating each of solvers who provided the answers based on a predetermined calculation formula, and determining means for determining an incentive with respect to each of the solvers depending on evaluation results obtained by the evaluating means. According to the question answering system of the present invention, it is possible to suppress the personnel expenses of having the solvers for answering the questions, and also improve the quality of the question answering system.

A further object of the present invention is to provide a computer-readable storage medium which stores a program for causing a computer to operate as a question answering system, wherein the program comprises first storing means for causing the computer to store question information together with first time information, second storing means for causing the computer to store answer information with respect to the question information together with solver information and second time information, and evaluating means for causing the computer to evaluate a solver indicated by the solver information based on the first and second time information. According to the computer-readable storage medium of the present invention, it is possible to suppress the personnel expenses of having the solvers for answering the questions, and also improve the quality of the question answering system.

Another object of the present invention is to provide a computer-readable storage medium which stores a program for causing a computer to operate as a question answering system, wherein the program comprises first registering means for causing the computer to register question information, transmitting means for causing the computer to transmit to a questioner an answer provided by a solver with respect to the registered question information, second registering means for causing the computer to register an evaluation of the answer made by the questioner, and evaluating means for causing the computer to evaluate the solver based on the registered evaluation made by the questioner. According to the computer-readable storage medium of the present invention, it is possible to suppress the personnel expenses of having the solvers for answering the questions, and also improve the quality of the question answering system.

Still another object of the present invention is to provide a computer-readable storage medium which stores a program for causing a computer to operate as a question answering system, wherein the program comprises storing means for causing the computer to store questions and corresponding answers, counting means for causing the computer to count a number of times a reference is made to each of the stored answers, and evaluating means for causing the computer to obtain a sum total of the number of times the reference is made to the stored answers for each of solvers who provided the answers, and evaluate each of the solvers based on the sum total. According to the computer-readable storage medium of the present invention, it is possible to suppress the personnel expenses of having the solvers for answering the questions, and also improve the quality of the question answering system.

Another object of the present invention is to provide a computer-readable storage medium which stores a program for causing a computer to operate as a question answering system, wherein the program comprises registering means for causing the computer to register answers with respect to questions, evaluating means for causing the computer to evaluate each of solvers who provided the answers based on a predetermined calculation formula, and determining means for causing the computer to determine an incentive with respect to each of the solvers depending on evaluation results obtained by the evaluating means. According to the computer-readable storage medium of the present invention, it is possible to suppress the personnel expenses of having the solvers for answering the questions, and also improve the quality of the question answering system.

Other objects and further features of the present invention will be apparent from the following detailed description when read in conjunction with the accompanying drawings.

BRIEF DESCRIPTION OF THE DRAWINGS

FIG. 5 is a diagram showing an incentive definition table;

FIG. 6 is a diagram showing a structure of a FAQ-database;

FIG. 7 is a diagram showing a structure of a QA-database;

FIG. 8 is a diagram showing a structure of an answer evaluation database;

DESCRIPTION OF THE PREFERRED EMBODIMENTS

Figure 1:
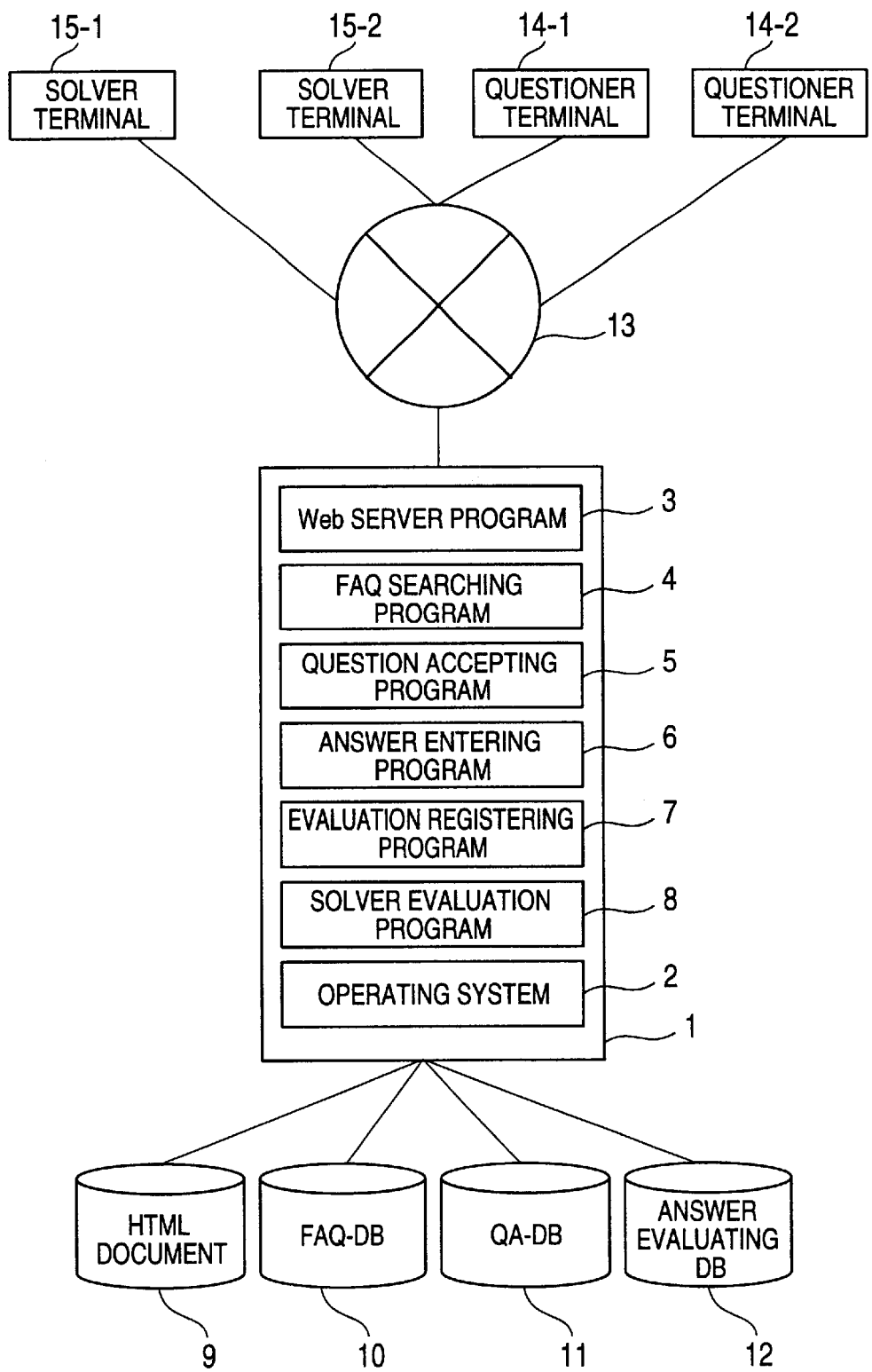
FIG. 1 is a diagram showing a system structure of an embodiment of a question answering system according to the present invention.

FIG. 1 is a diagram showing a system structure of an embodiment of a question answering system according to the present invention.

The question answering system shown in FIG. 1 includes a question answering server 1. The question answering server 1 is formed by a general personal computer having a CPU, a main storage unit, an external storage unit, a display unit, a printer unit, a network control unit, a mouse and the like. An operating system (OS) 2 is loaded into the main storage unit (not shown) of the question answering server 1 from the external storage unit (not shown) of the question answering server 1, and controls the general operation of the question answering server 1.

Under the control of the operating system 2, a Web server program 3 is loaded into the main storage unit and executed. The Web server program 3 itself is known, and transmits data depending on a request from a client terminal based on a known HTTP protocol. A FAQ searching program 4, a question accepting program 5, an answer entering program 6, and an evaluation registering program 7 are called CGI programs, which are linked to the Web server program 5, and make data communication over that prescribed by the HTTP protocol between client terminals (that is, between questioner terminals 14 and solver terminals 15). These CGI programs carry out input and output with respect to a FAQ-database (FAQ-DB) 10, a QA-database (QA-DB) 11 and an answer evaluating database (DB) 12. In this embodiment, a solver evaluation program 8 does not link to the Web server program 3.

The FAQ searching program 4, the question accepting program 5, the answer entering program 6, the evaluation registering program 7 and the solver evaluation program 8 may respectively be loaded into the storage unit of the question answering server 1 from a computer-readable storage medium such as a floppy disk and a CD-ROM or, loaded from another computer via a network.

A HTML document 9 is a document which is to be transmitted by the Web server program 3 to the client terminals (questioner terminals 14 and solver terminals 15).

The questioner terminals 14 and the solver terminals 15 may have the same hardware structure as the question answering server 1. The questioner terminals 14 and the solver terminals 15 are respectively controlled by a predetermined operating system, and a Web browser program is executed under the predetermined operating system. For the sake of convenience, FIG. 1 only shows two questioner terminals 14-1 and 14-2 and two solver terminals 151 and 15-2.

The question answering server 1, the questioner terminals 14 and the solver terminals 15 are mutually connected via the Internet 13. Accordingly, each of the question answering server 1, the questioner terminals 14 and the solver terminals 15 may be located anywhere in the world as long as each is connectable to the Internet 13.

Next, a description will be given of a structure of the FAQ-DB 10, by referring to FIG. 6. FIG. 6 is a diagram showing the structure of the FAQ-DB 10. As shown in FIG. 6, the FAQ-DB 10 has a table format including five columns, namely, "FAQID", "QUESTION", "ANSWER", "AID", and "AUID".

The column "FAQ-ID" is an identifier uniquely added to each record. The column "QUESTION" indicates contents of a question, and the column "ANSWER" indicates an answer to the question. The column "AID" indicates identification information with respect to the answer, and the column "AUID" indicates identification information of a solver who created the answer.

Next, a description will be given of a structure of the QA-DB 11, by referring to FIG. 7. FIG. 7 is a diagram showing the structure of the QA-DB 11. As shown in FIG. 7, the QA-DB 11 has a table format including four columns, namely, "QID", "QUESTION", "QUID" and "QTIME".

The column "QID" is an identifier uniquely added to the question. The column "QUESTION" stores the contents of the question from the questioner. The column "QUID" stores identification information of the questioner. In this embodiment, an e-mail address of the questioner is used as the identification information of the questioner. The column "QTIME" stores time and day information at a point in time when the question of the questioner was registered.

Next, a description will be given of a structure of the answer evaluating DB 12, by referring to FIG. 8. FIG. 8 is a diagram showing the structure of the answer evaluating DB 12. As shown in FIG. 8, the answer evaluating DB 12 has a table format including nine columns, namely, "QID", "QUESTION", "QUID", "QTIME", "AID", "ANSWER", "AUID", "ATIME" and "EVAL".

The four columns "QID", "QUESTION", "QUID" and "QTIME" in FIG. 8 are the same as the corresponding columns of the QA-DB 11 described above in conjunction with FIG. 7, and a description thereof will be omitted.

The column "AID" indicates the identification information which is uniquely added to the answer. The column "ANSWER" indicates the answer by the solver. The column "AUID" indicates the identification information of the solver. The columns "ATIME" stores time and day information at a point in time when the solver registered the answer. The column "EVAL" stores an evaluation result which indicates the degree of satisfaction of the questioner with respect to the answer given by the solver.

Figure 2:
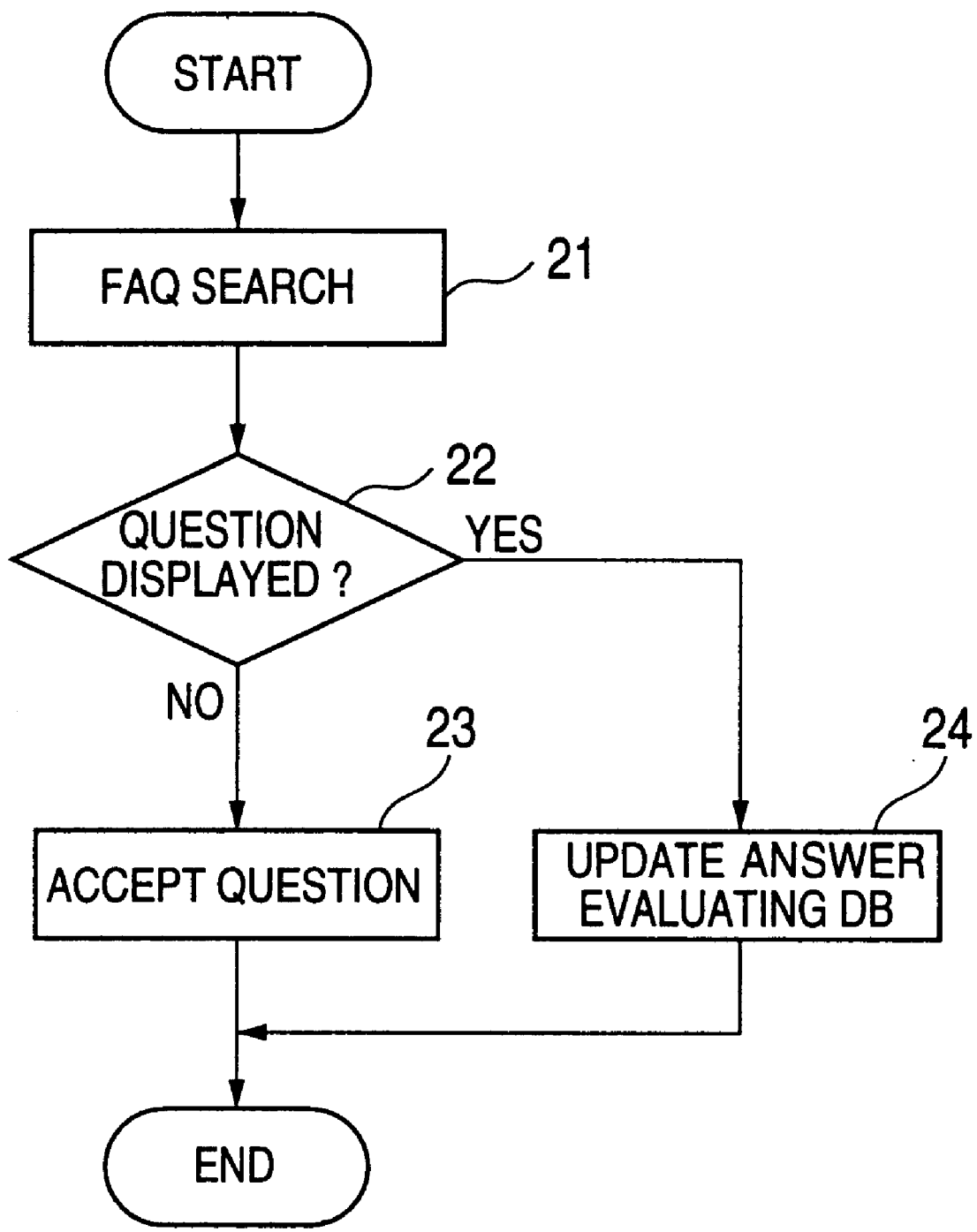
FIG. 2 is a flow chart for explaining processes of a FAQ searching program and a question accepting program.

Next, a description will be given of the processes of the FAQ searching program 4 and the question accepting program 5, by referring to FIG. 2. FIG. 2 is a flow chart for explaining the processes of the FAQ searching program 4 and the question accepting program 5.

Figures 9, 10:
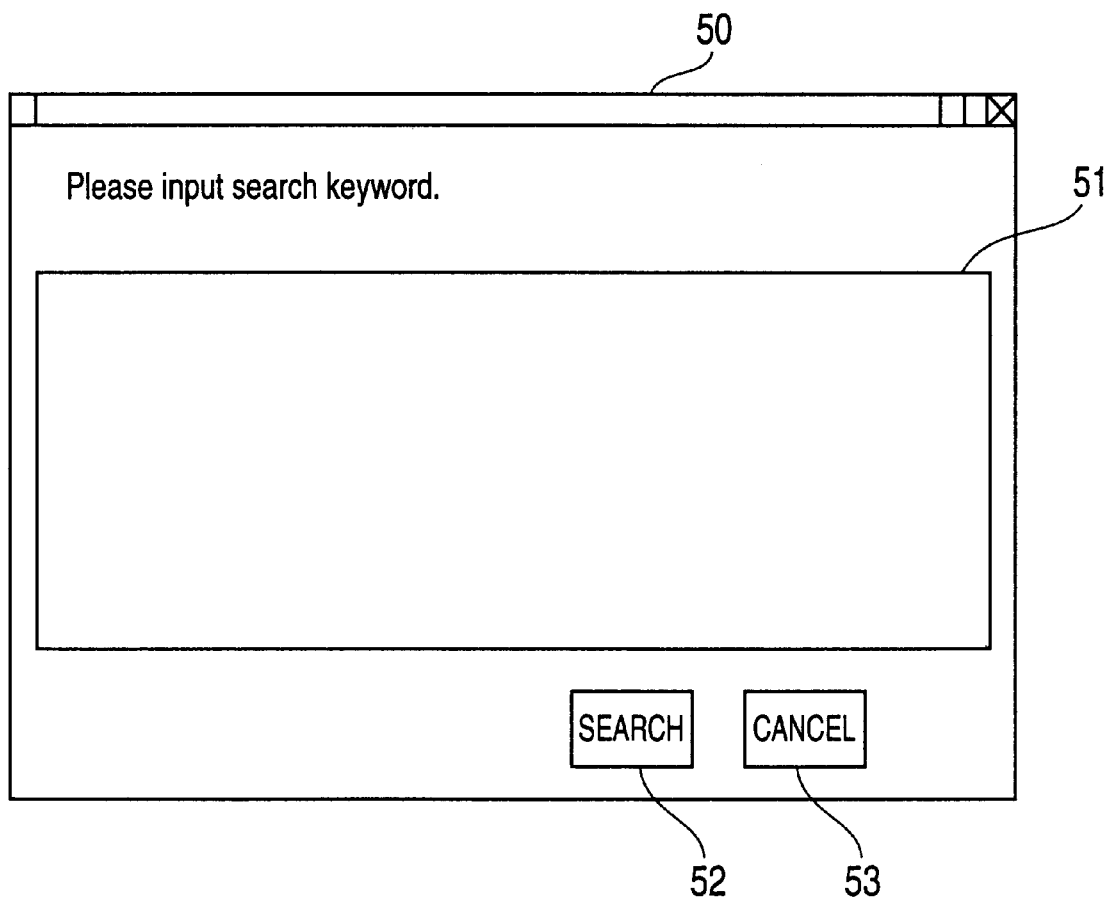
FIG. 9 is a diagram showing a structure of a reference number table.
FIG. 10 is a diagram showing a FAQ search window.

In FIG. 2, the questioner carries out a FAQ search in a step 21. When an obscurity occurs and the obscurity is to be resolved, it is fastest to make the FAQ search. When making the FAQ search, a FAQ search window 50 shown in FIG. 10 is displayed at the questioner terminal 14. In the FAQ search window 50, the questioner inputs a keyword which is to be used for the FAQ search in a keyword input field 51, and then pushes a "search" button 52 to search the FAQ-DB 10. The FAQ search is cancelled by pushing a "cancel" button 53.

Figure 11:
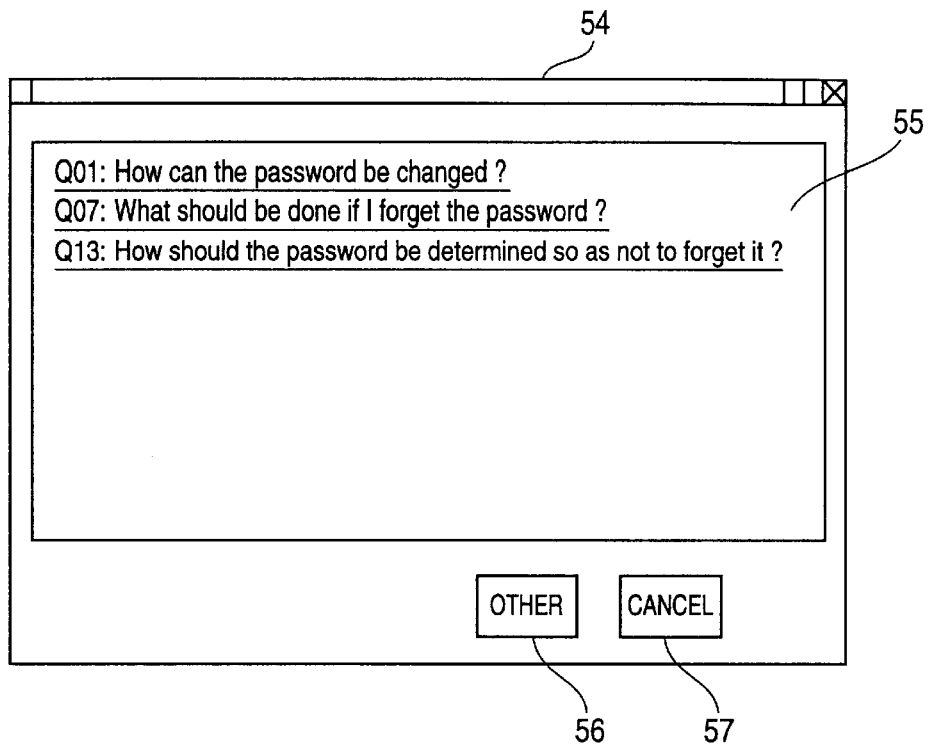
FIG. 11 is a diagram showing a FAQ search result window.

Next, a FAQ search result window 54 shown in FIG. 11 is displayed at the questioner terminal 14. Of the search results, only the contents of the questions are listed in a search result list window 55. The list in the search result list field 55 has a hyper text link, so that a corresponding answer to the question is displayed by clicking an underlined portion by the mouse.

Accordingly, if a question the questioner wishes to ask is displayed in the search result list field 55, the questioner clicks this question by the mouse. Otherwise, the questioner pushes an "other" button 56. A step 22 shown in FIG. 2 decides whether or not the question the questioner wishes to ask is displayed in the search result list field 55 and is clicked by the mouse, that is, whether or not a link is clicked.

If the decision result in the step 22 is YES, the question answering server 1 transmits and displays a corresponding answer on the questioner terminal 14 in a step 24, and also increments a value of a column "COUNT" corresponding to a column "AUID" of the clicked FAQ in a reference number table shown in FIG. 9.

Figure 12:
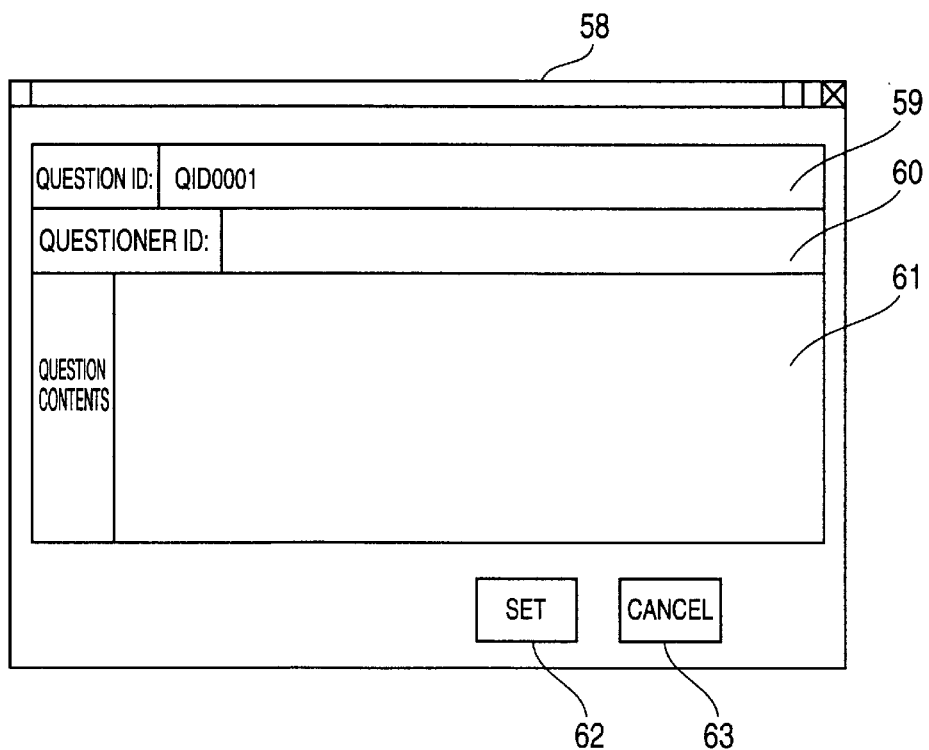
FIG. 12 is a diagram showing a question input window.

On the other hand, if the decision result in the step 22 is NO, the question answering server 1 transmits and displays a question input window 58 shown in FIG. 12 on the questioner terminal 14 in a step 23. The question input window 58 shown in FIG. 12 includes a question ID field 59, a questioner ID field 60, a question content input field 61, a "set" button 62, and a "cancel" button 63. A question ID which is dynamically generated by the question answering server 1 is entered into the question ID field 59 in advance, but the questioner himself makes the entries to the questioner ID field 60 and the question content input field 61. In this embodiment, it is assumed for the sake of convenience that the questioner inputs his e-mail address in the questioner ID field 60. When the questioner inputs the necessary information in the questioner ID field 60 and the question content input field 61 and pushes the "set" button 62, the value in the question ID field 59, the value in the questioner ID field 60, the value in the question content input field 61, and the time and day information at the present point in time are respectively stored in the columns "QID", "QUESTION" and "QUID" and "UTIME" of the QA-DB 11.

The process shown in FIG. 2 ends after the step 23 or 24.

Figure 3:
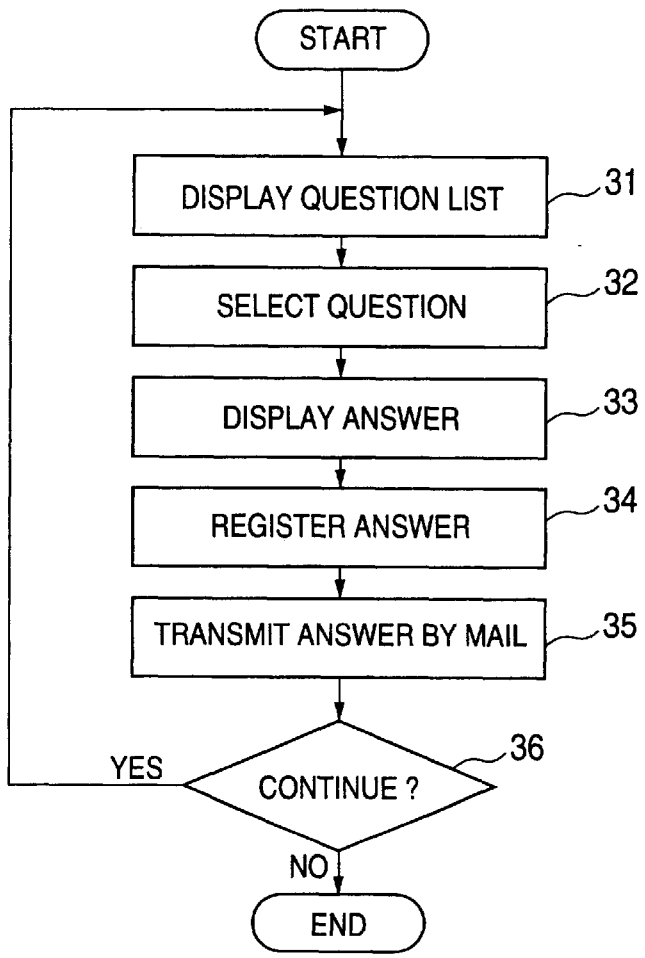
FIG. 3 is a flow chart for explaining a process of an answer entering program.

Next, a description will be given of a process of an answer entering program, by referring to FIG. 3. FIG. 3 is a flow chart for explaining the process of the answer entering program.

Figure 13:
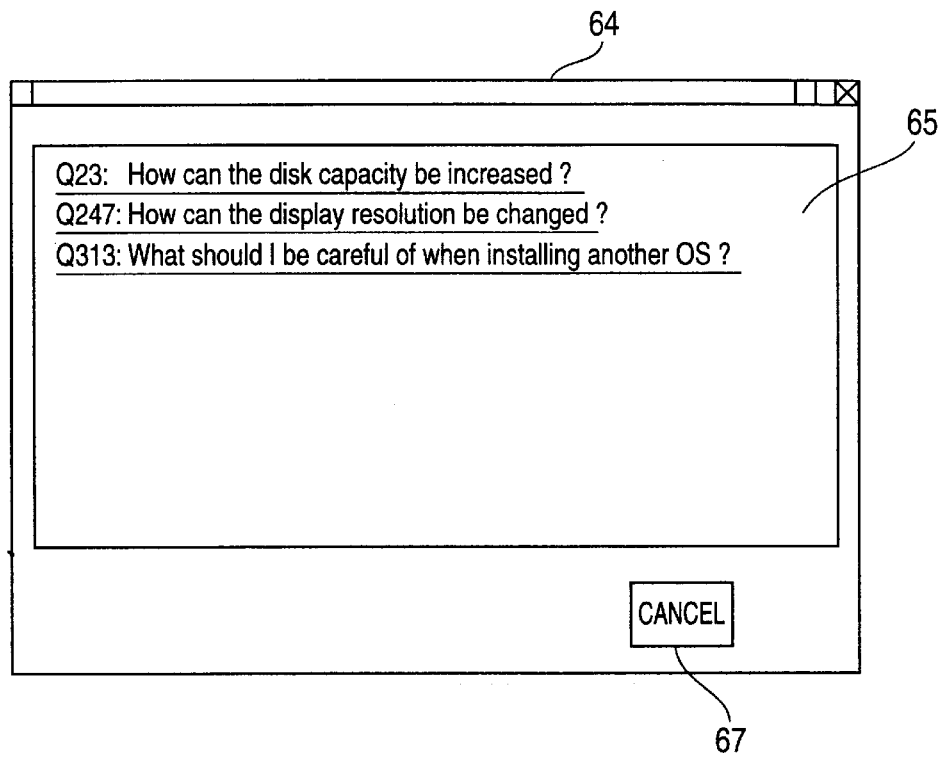
FIG. 13 is a diagram showing a question select window.

In FIG. 3, a question select window 64 shown in FIG. 13 is displayed on the solver terminal 15 in a step 31. The display contents in a question list field 65 of the question select window 64 include the questions having the hyper text link. Hence, when the solver clicks one of the underlined portions by the mouse in a step 32, an answer input window 68 shown in FIG. 14 is displayed on the solver terminal 15 in a step 33.

Figure 14:
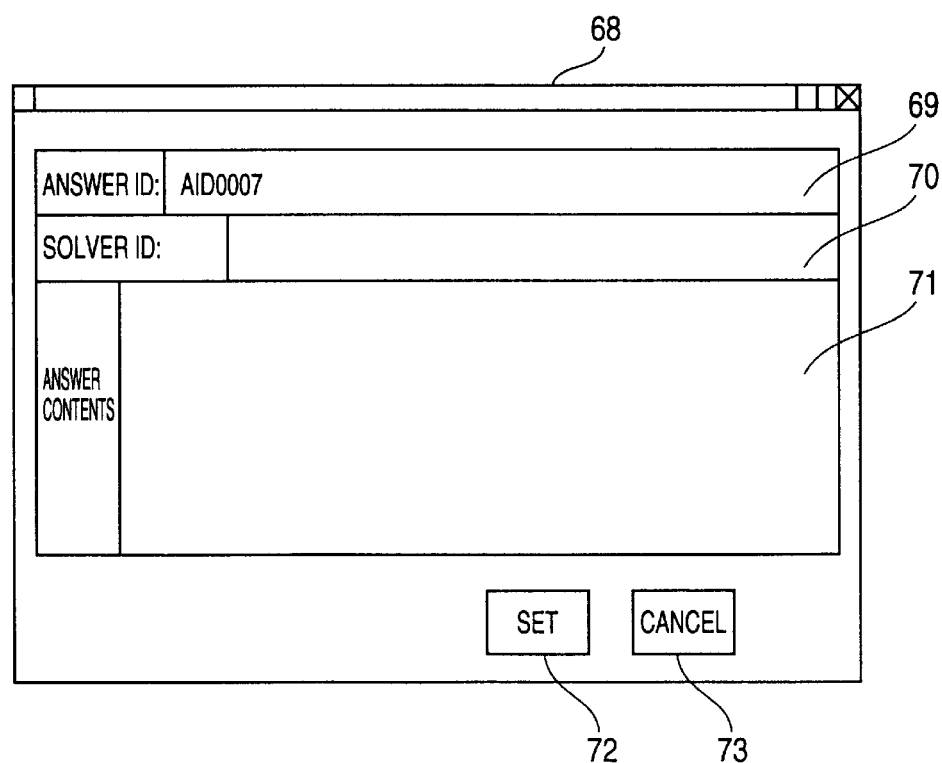
FIG. 14 is a diagram showing an answer input window.

The answer input window 68 shown in FIG. 14 includes an answer ID field 69, a solver ID input field 70, an answer content input field 71, a "set" button 72, and a "cancel" button 73.

An answer ID which is dynamically generated by the question answering server 1 is entered into the answer ID field 69 in advance, but the solver himself inputs the necessary information in the solver ID input field 70 and the answer content input field 71. When the solver inputs the necessary information in the solver ID input field 70 and the answer content input field 71 and pushes the "set" button 72 in a step 34, data corresponding to the question selected in the step 32 is obtained from the QA-DB 11 and stored in the column having the same name in the answer evaluating DB 12. In addition, the information in the answer ID field 69, the information in the solver ID input field 70, the information in the answer content input field 71, and the time and day information at the present point in time are respectively stored in the columns "AID", "AUID", "ANSWER" and "ATIME" of the answer evaluating DB 12.

Then, the answer contents are transmitted to the questioner by e-mail in a step 35. The address of the Web page for registering an evaluation corresponding to the column "AID" is indicated on the e-mail which is transmitted to notify the answer contents to the questioner, so that the questioner may evaluate the answer given by the solver, as will be described later.

A step 36 decides whether or not the solver wishes to continue and answer another question. The process returns to the step 31 if the decision result in the step 36 is YES, and the process ends if the decision result in the step 36 is NO.

Figure 4:
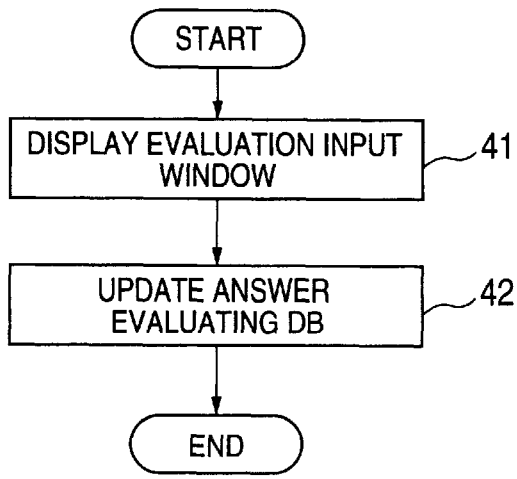
FIG. 4 is a flow chart for explaining a process of an evaluation registering program.

Next, a description will be given of a process of an evaluation registering program, by referring to FIG. 4. FIG. 4 is a flow chart for explaining the process of the evaluation registering program.

Figure 15:
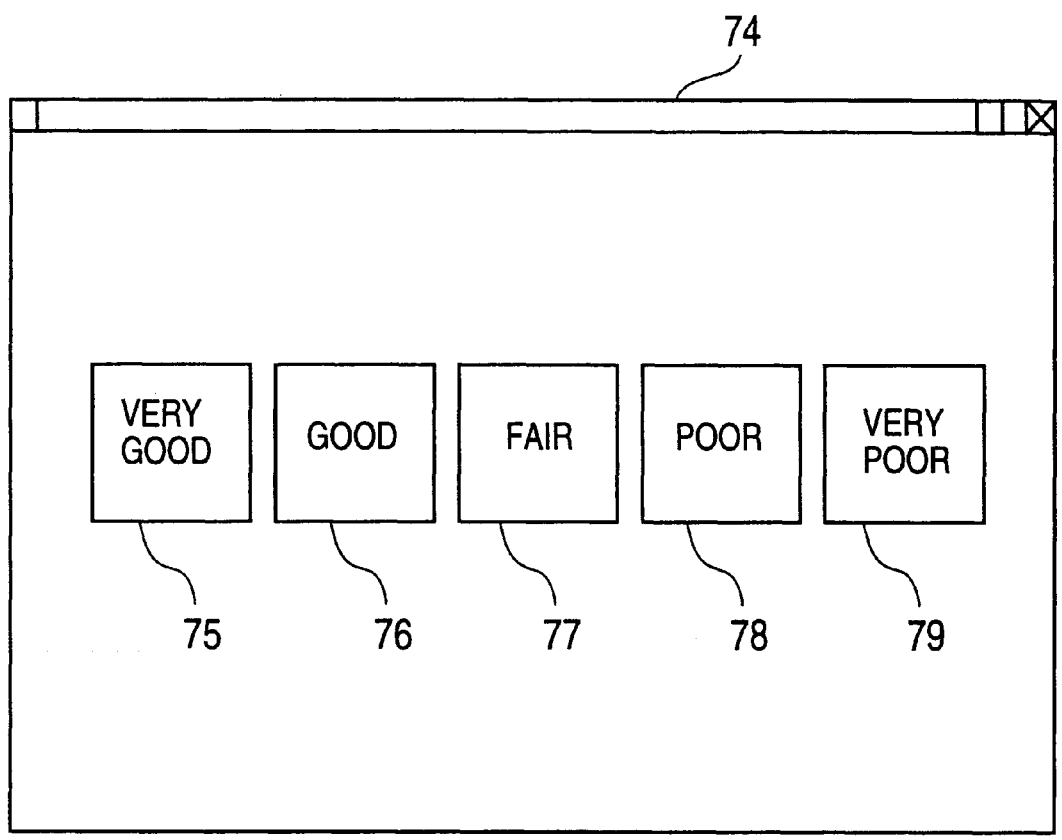
FIG. 15 is a diagram showing an evaluation input window.

The e-mail which is received by the questioner includes the Web page address for registering the evaluation corresponding to the column "AID", in addition to the answer contents. Hence, when the questioner specifies the Web page address for registering the evaluation by the Web browser program in a step 41, an evaluation input window 74 shown in FIG. 15 is displayed on the questioner terminal 14. The evaluation input window 74 includes an "very good" button 75, a "good" button 76, a "fair" button 77, a "poor" button 78, and a "very poor" button 79. For example, the "very good" button 75 is defined as eight points, the "good" button 76 is defined as four points, the "fair" button 77 is defined as two points, the "poor" button 78 is defined as one point, and the "very poor" button 79 is defined as zero point. When one of the buttons 75 through 79 is pushed, a corresponding point is notified to the question answering server 1 and is stored in the column "EVAL" of the corresponding record in the answer evaluating DB 12, in a step 42, thereby updating the answer evaluating DB 12. The process ends after the step 42.

Next, a description will be given of the solver evaluation program 8. The solver evaluation program 8 obtains an index for evaluating the solver, and determines an incentive with respect to the solver by referring to an incentive definition table shown in FIG. 5 using the index.

Various methods may be used to obtain the index, and a description will be given of three methods.

According to a first method, a sum total of EVAL/(ATIME−QTIME)*K of each record is calculated for each solver of the solver evaluating DB 12, that is, for each entry of the column "AUID", where K denotes a parameter which is arbitrarily determined by the operation. The calculated sum total is regarded as the index of the solver. According to this first method, the evaluation of the solver is becomes higher as the evaluation of the solver with respect to the answer becomes higher and the time required by the solver to answer becomes shorter.

According to a second method, a sum total of EVAL/(ATIME−QTIME)*K of each record is calculated for each solver of the solver evaluating DB 12, that is, for each entry of the column "AUID", where K denotes a parameter which is arbitrarily determined by the operation. The calculated sum total is added to COUNT*L of the reference number table shown in FIG. 9, where L denotes a parameter which is arbitrarily determined by the operation. An added result which is obtained is regarded as the index of the solver. According to this second method, the evaluation of the solver is becomes higher as the evaluation of the solver with respect to the answer becomes higher and the time required by the solver to answer becomes shorter, similarly to the first method. Furthermore, according to this second method, the evaluation of the solver becomes higher as the answers given by the solver are referred to more often by the questioners.

According to a third method, a sum total of EVAL of each record is calculated for each solver of the solver evaluating DB 12, that is, for each entry of the column "AUID". This sum total is regarded as the index. According to this third method, the quickness of the solver for giving the answer does not affect the evaluation of the solver, and the solver is purely evaluated depending on the degree of satisfaction of the questioners with respect to the answers given by the solver.

Of course, the calculation formulas used to obtain the index are not limited to those used by the first through third methods described above.

In the question answering server 1, the index obtained by one of the methods described above is used to search the corresponding incentive in the incentive definition table shown in FIG. 5. The searched incentive may be displayed on the display unit of the question answering server 1 or printed on the printer unit of the question answering server 1.

Further, the present invention is not limited to these embodiments, but various variations and modifications may be made without departing from the scope of the present invention.

What is claimed is:

1. A question answering system comprising:

first storing means for storing question information received from a questioner together with first time information indicating a time of receipt of the question information;

second storing means for storing answer information received from a solver with respect to the question information together with solver information and second time information indicating a time of receipt of the answer information; and evaluating means for evaluating a solver indicated by the solver information based on a lapsed time between the first and second time information.

2. A question answering system comprising:

registering means for registering answers with respect to questions;

evaluating means for evaluating each of solvers who provided the answers based on a pre-determined calculation formula; and determining means for determining an incentive with respect to each of the solvers depending on evaluation results obtained by said evaluating means, the predetermined calculation formula being selected from a group consisting of a sum total of EVAL/(ATIME−OTIME)*K that is calculated for each solver and a sum total of EVAL/(ATIME−OTIME)*K that is calculated for each solver plus COUNT*L, wherein EVAL denotes an evaluation result that indicates a degree of satisfaction of the questioner with respect to the answer given by the solver, wherein ATIME denotes time and day information at a point in time when the solver registered the answer, wherein OTIME denotes time and day information at a point in time when the question of the questioner was registered, wherein K denotes a parameter that is arbitrarily determined by an operation, wherein COUNT denotes a number of times a reference is made to the solver's answer, and wherein L denotes a parameter that is determined by the operation.

3. A computer-readable storage medium which stores a program for causing a computer to operate as a question answering system, said program comprising:

first storing means for causing the computer to store question information received from a questioner together with first time information indicating a time of receipt of the question information;

second storing means for causing the computer to store answer information received from a solver with respect to the question information together with solver information and second time information indicating a time of receipt of the answer information; and evaluating means for causing the computer to evaluate a solver indicated by the solver information based on a lapsed time between the first and second time information.

4. A computer-readable storage medium which stores a program for causing a computer to operate as a question answering system, said program comprising:

registering means for causing the computer to register answers with respect to questions;

evaluating means for causing the computer to evaluate each of solvers who provided the answers based on a pre-determined calculation formula; and determining means for causing the computer to determine an incentive with respect to each of the solvers depending on, evaluation results obtained by said evaluating means, the predetermined calculation formula being selected from a group consisting of a sum total of EVAL/(ATIME−OTIME)*K that is calculated for each solver and a sum total of EVAL/(ATIME−OTIME)*K that is calculated for each solver plus COUNT*L, wherein EVAL denotes an evaluation result that indicates a degree of satisfaction of the questioner with respect to the answer given by the solver, wherein ATIME denotes time and day information at a point in time when the solver registered the answer, wherein OTIME denotes time and day information at a point in time when the question of the questioner was registered, wherein K denotes a parameter that is arbitrarily determined by an operation, wherein COUNT denotes a number of times a reference is made to the solver's answer, and wherein L denotes a parameter that is determined by the operation.

* * * * *

UNITED STATES PATENT AND TRADEMARK OFFICE
CERTIFICATE OF CORRECTION

PATENT NO. : 6,631,377 B2
DATED : October 7, 2003
INVENTOR(S) : Hiroshi Kuzumaki It is certified that error appears in the above-identified patent and that said Letters Patent is hereby corrected as shown below:

<u>Column 10,</u>
Line 3, delete ",".

Signed and Sealed this

Sixteenth Day of December, 2003

JAMES E. ROGAN
*Director of the United States Patent and Trademark Office*